May 12, 1942.  P. G. EDWARDS ET AL  2,282,464
SPEECH TRANSMISSION SYSTEM
Filed Feb. 25, 1941  10 Sheets-Sheet 1

FIG. 1

INVENTORS: P. G. EDWARDS
E. R. TAYLOR
BY H. A. Burgess
ATTORNEY

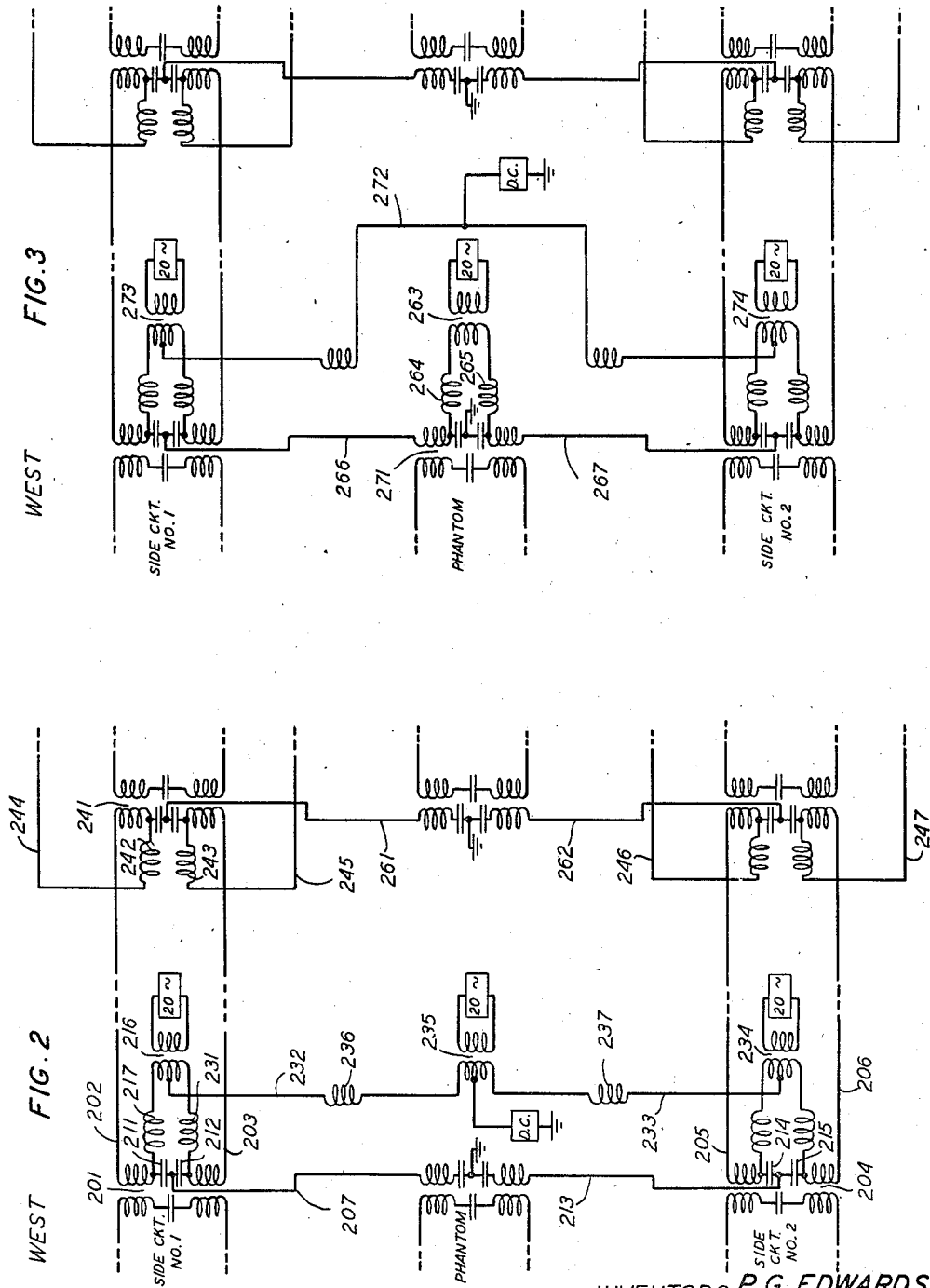

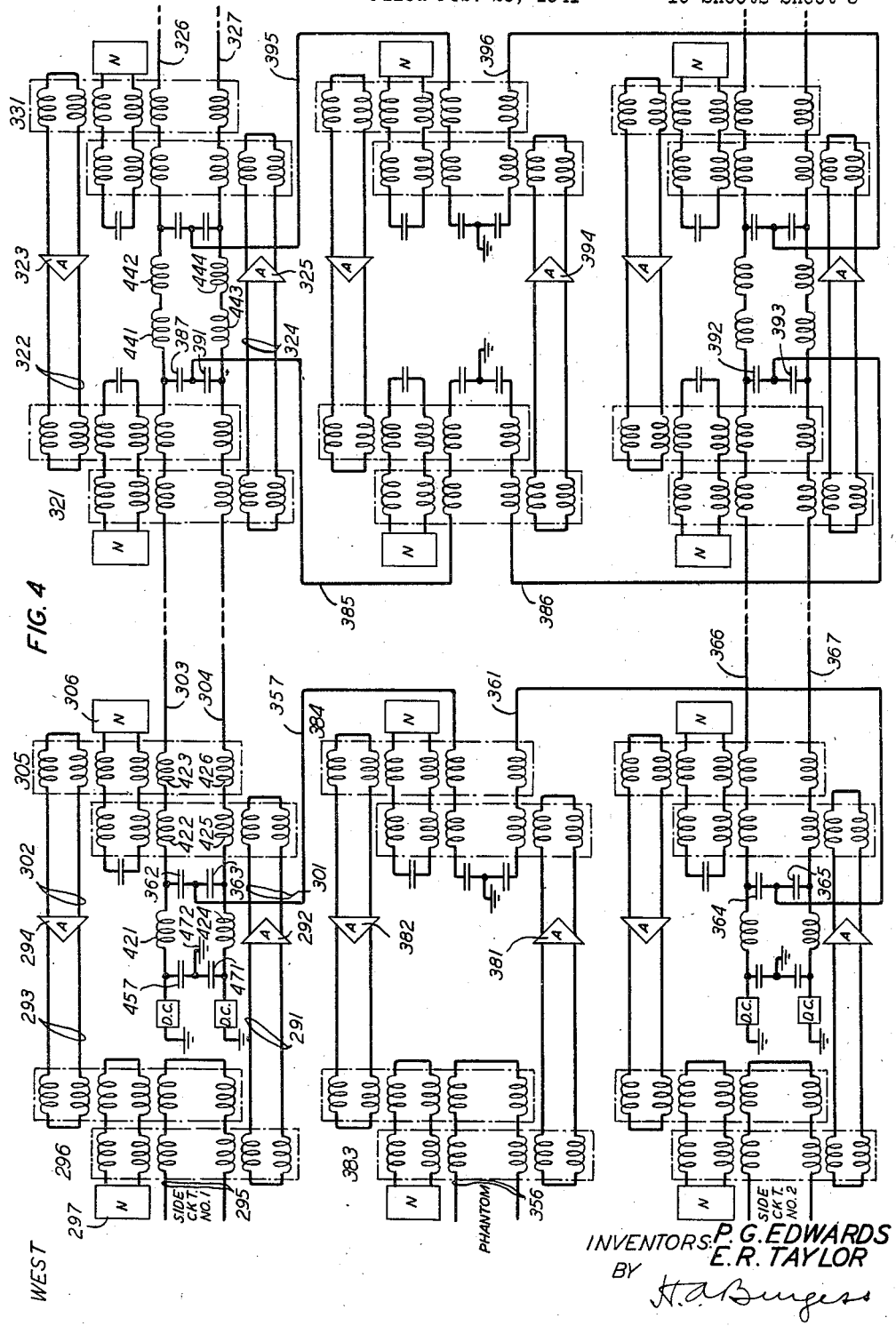
May 12, 1942. P. G. EDWARDS ET AL 2,282,464
SPEECH TRANSMISSION SYSTEM
Filed Feb. 25, 1941 10 Sheets-Sheet 3
INVENTORS: P. G. EDWARDS
E. R. TAYLOR
BY
ATTORNEY May 12, 1942.  P. G. EDWARDS ET AL  2,282,464

SPEECH TRANSMISSION SYSTEM

Filed Feb. 25, 1941  10 Sheets-Sheet 4

FIG. 5

INVENTORS: P. G. EDWARDS
E. R. TAYLOR
BY
*H. A. Burgess*
ATTORNEY

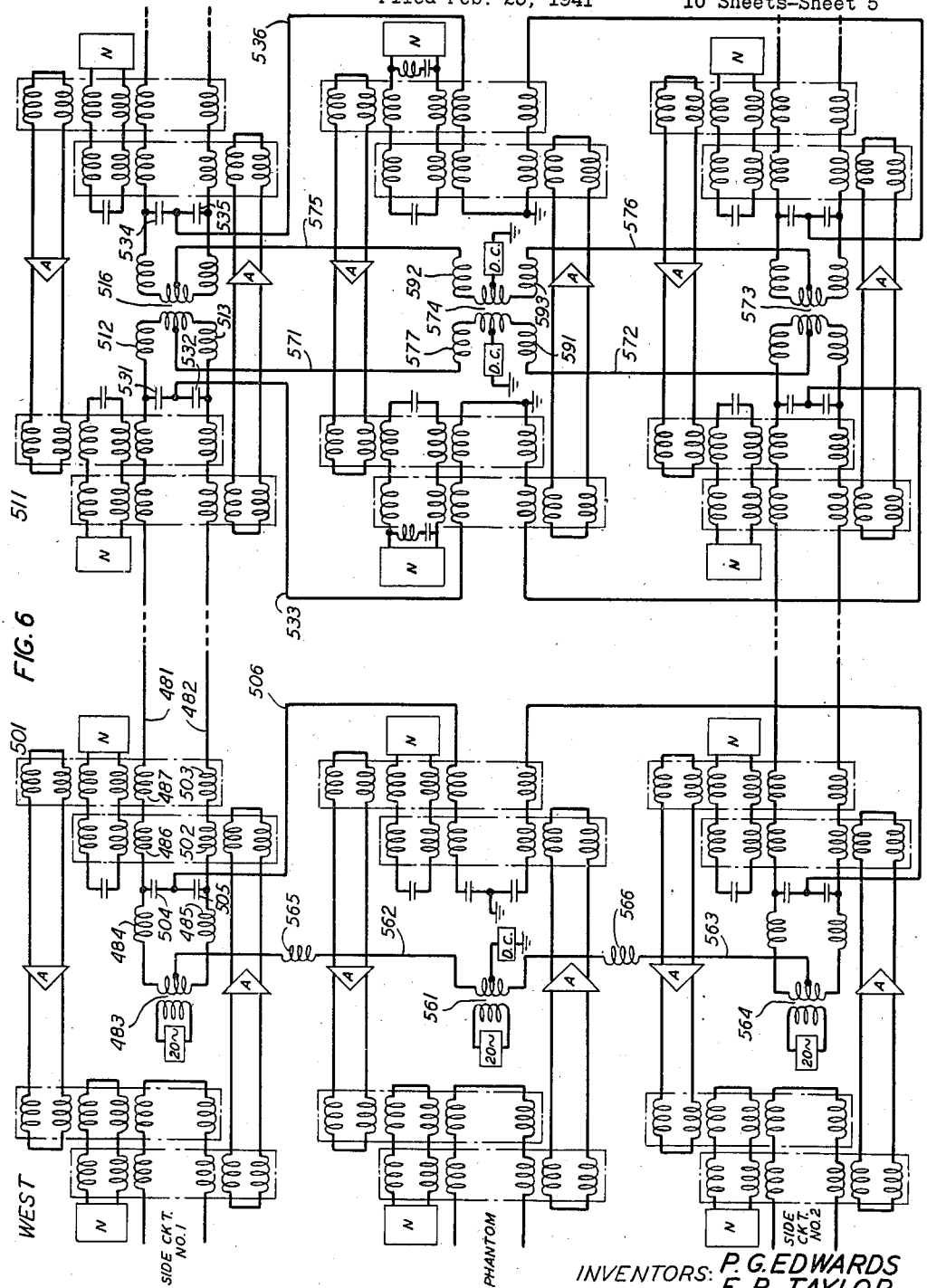

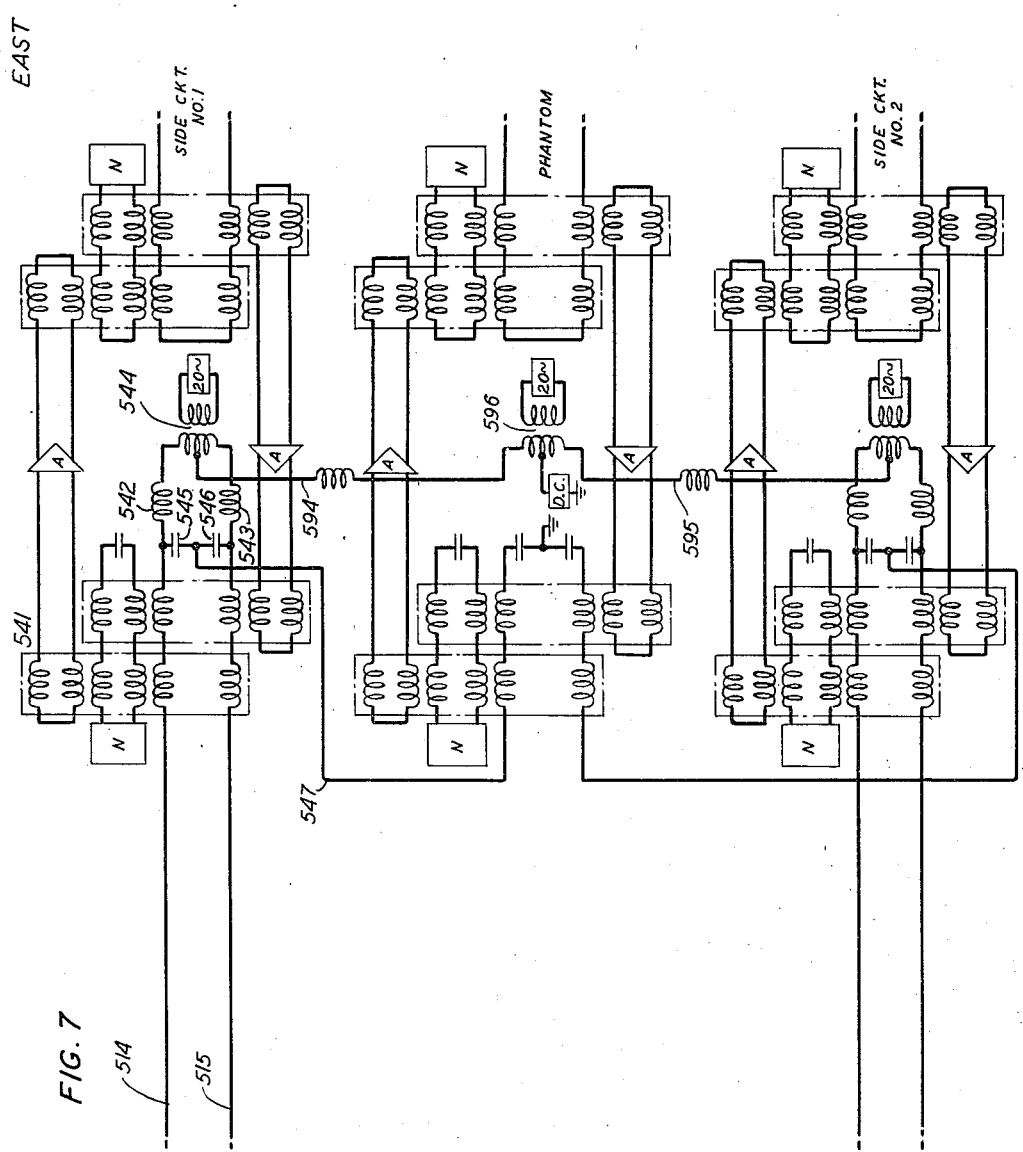

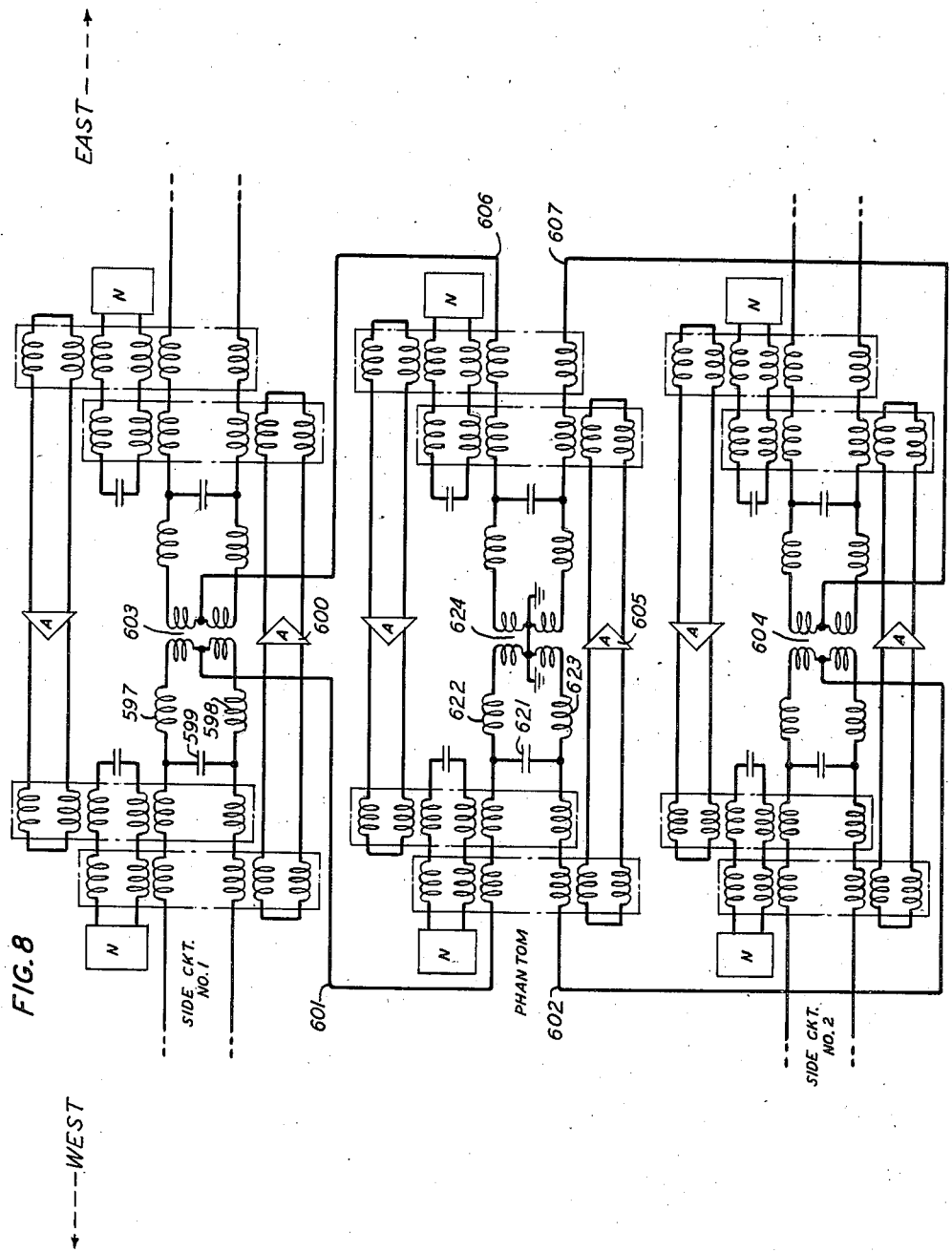

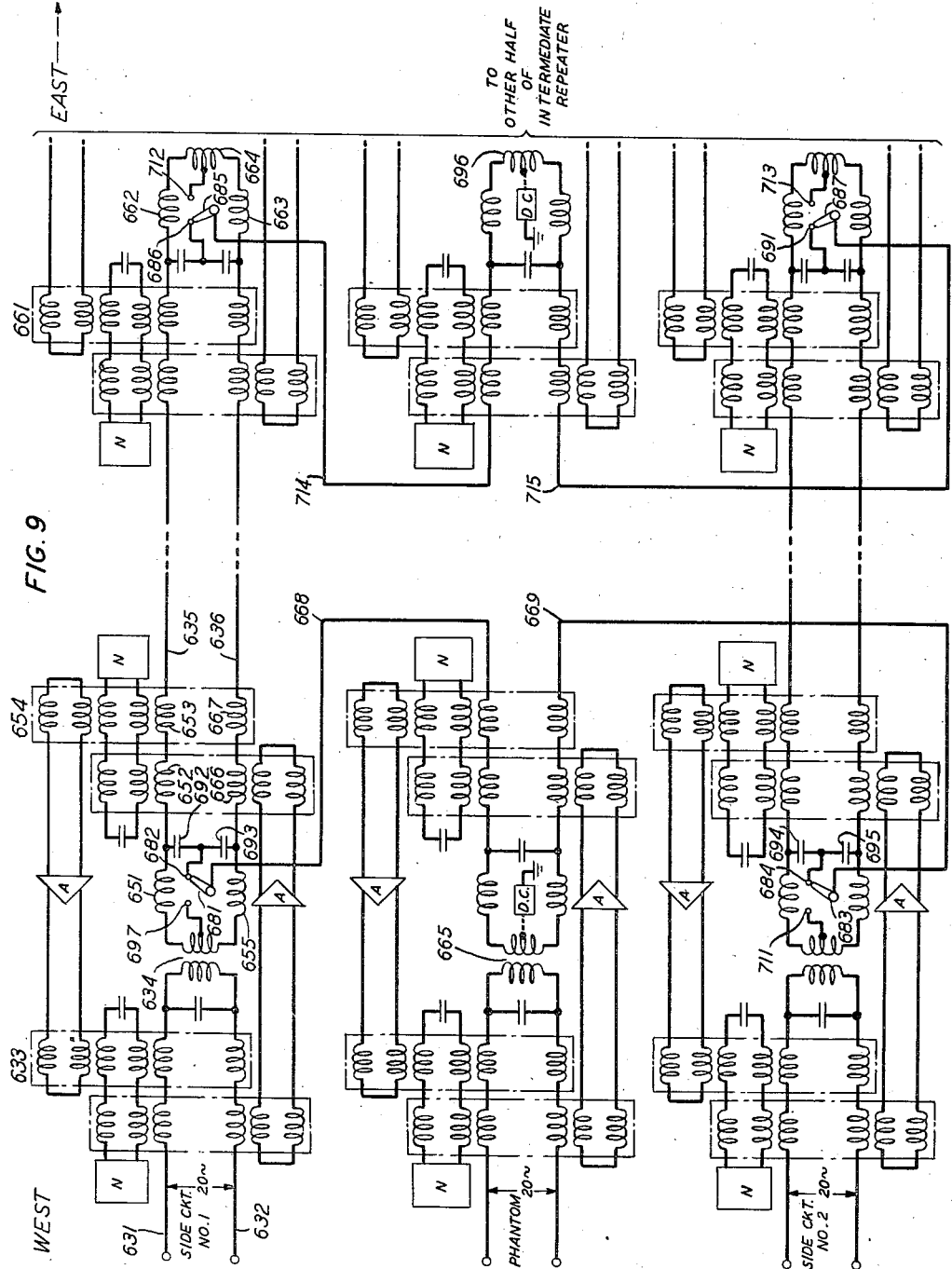

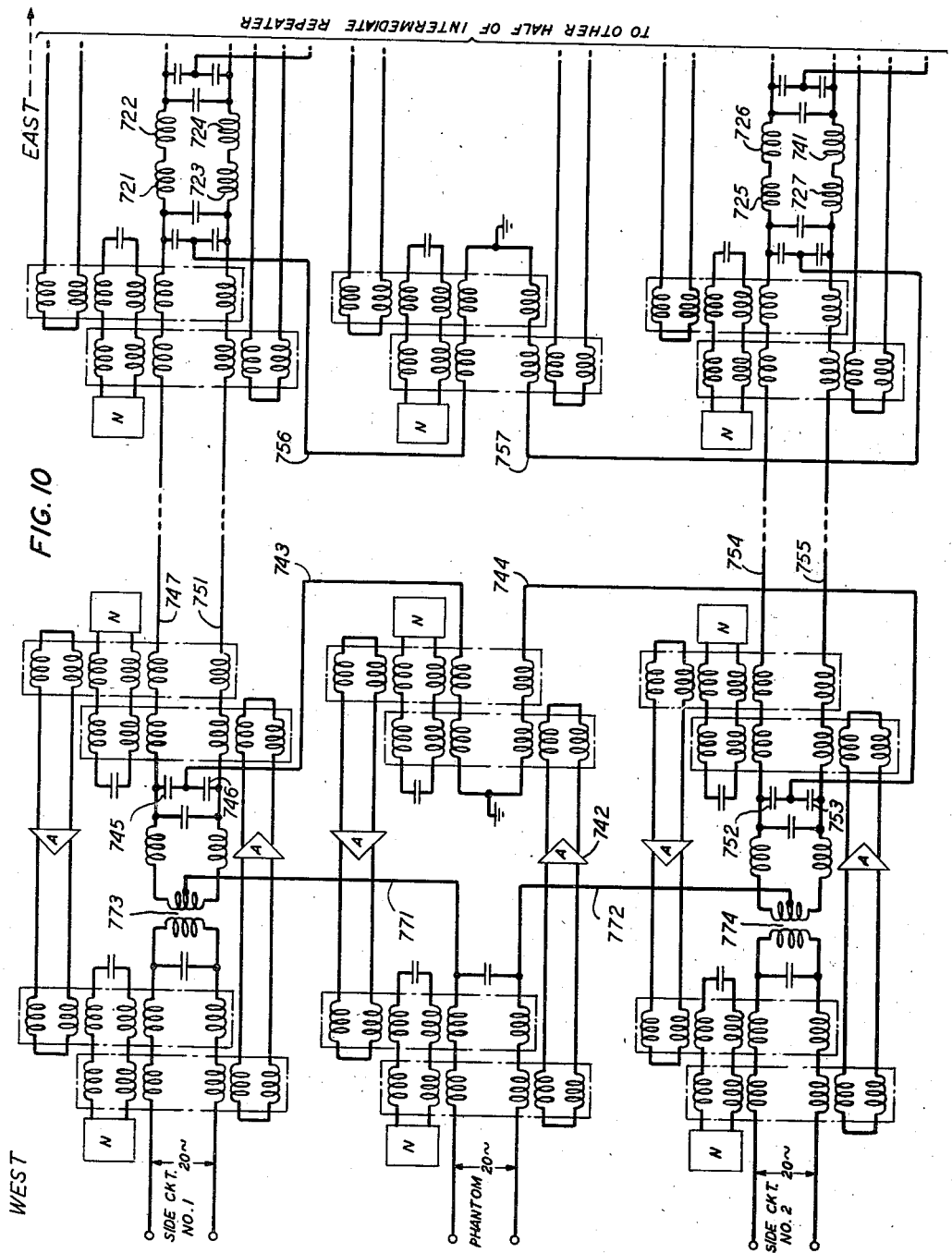

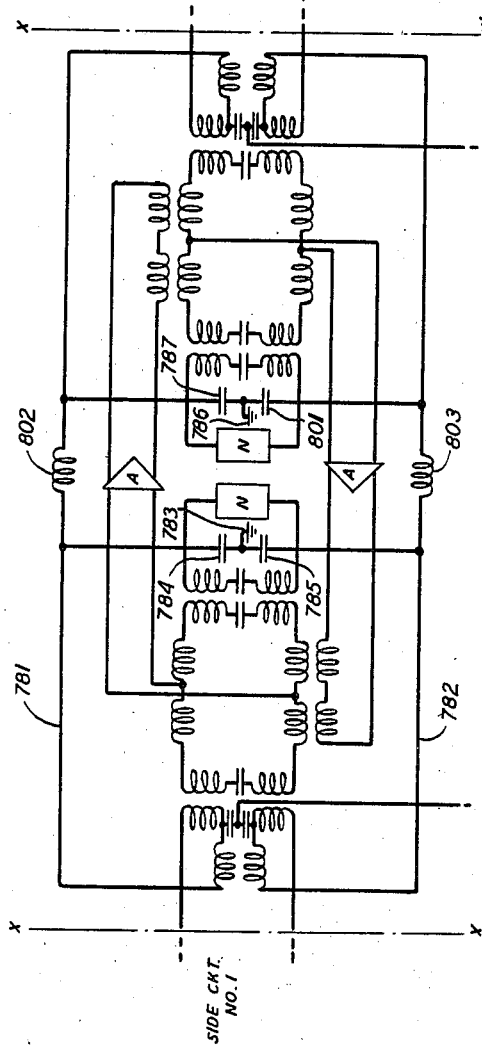

Patented May 12, 1942

2,282,464

UNITED STATES PATENT OFFICE 2,282,464

SPEECH TRANSMISSION SYSTEM

Paul G. Edwards, Verona, N. J., and Edmund R. Taylor, Mount Vernon, N. Y., assignors to Bell Telephone Laboratories, Incorporated, New York, N. Y., a corporation of New York Application February 25, 1941, Serial No. 380,446

16 Claims. (Cl. 179—3)

This invention relates to a speech transmission system of the type which includes telephone repeaters spaced at intervals along the transmission line.

An object of the invention is to increase the efficiency of speech transmission systems which include telephone repeaters.

A more specific object of the invention is to facilitate and render more economical the transmission over such a speech transmission system of signaling currents other than the voice frequency currents.

It is common practice, of course, in the operation of long speech transmission systems of the type which include telephone repeaters to transmit, in addition to the voice frequency telephone currents, other signaling currents. For example, direct current may be transmitted for dialing purposes or for telegraph transmission purposes while low frequency alternating current (usually of the order of 20 cycles or 135 cycles) may be transmitted for ringing purposes. In the past, transmission of these auxiliary signaling currents has presented perplexing and expensive problems. In the first place there has been the problem of superimposing these currents on the speech transmission lines without disturbing the exact balance which is required of the system; a problem usually solved only by rather expensive expedients. In the second place, the telephone repeaters, being designed to amplify currents of the order of the voice frequencies, are not adapted to pass the direct current and low frequency alternating current signaling currents without resultant distortion so that it has been necessary to provide means for by-passing the signaling currents around the repeaters or in certain cases to provide a separate source of signaling current at each repeater point. The by-pass arrangements of prior systems have in general been expensive, have offered complex balancing problems and have resulted in substantial transmission loss.

A feature of the present invention resides in inexpensive and simple means for applying signaling currents to a speech transmission system without disturbing the balance of the system.

A further feature of the invention is a simple and inexpensive by-pass arrangement which when applied to a speech transmission system does not disturb the balance thereof.

A still further feature of the invention resides in separate derivation of voice frequency phantom circuits and low frequency phantom circuits, the derivation path of the latter circuits being free of capacitances.

In accordance with one specific embodiment of the invention telegraph (direct current) signaling currents are applied to a voice transmission line in shunt with capacitances located between the line windings of the line repeating coil whereby the direct current composite sets are shunted by a low impedance at voice frequencies. Connection of the direct current signaling sets to the voice transmission lines has no appreciable effect thereon with respect to voice frequencies therefor and the vexing balancing problems encountered in the usual arrangement of the prior art in accordance with which the signaling currents were applied in shunt with the line conductors, that is, across a high impedance at voice frequencies, are eliminated. Phantom taps are derived from the capacitances referred to. Paths for by-passing the signaling currents around an intermediate telephone repeater are connected to the speech transmission lines in a manner similar to that by which the signaling currents are applied to the line and here, again, balancing difficulties are avoided.

A complete understanding of the various novel arrangements contemplated by the present invention as well as appreciation of the various desirable features thereof will be gained by consideration of the following detailed description in connection with the annexed drawings in which:

Fig. 1 illustrates schematically a transmission system of the type utilizing line repeating coils and including a novel manner of connecting direct current composite signaling sets and a novel by-pass circuit arrangement of the nature contemplated by the present invention;

Fig. 2 illustrates schematically a portion of a transmission system of the type illustrated by Fig. 1 including means for applying both direct current (telegraph) signals and 20-cycle signaling currents to the speech transmission lines;

Fig. 3 illustrates an arrangement which is a modification of that illustrated by Fig. 2 with respect to the method of applying the auxiliary signaling currents;

Figs. 4 and 5 illustrate schematically a transmission system of the type utilizing combined line and hybrid coils and including a novel manner of connecting direct current composite signaling sets and a novel by-pass circuit of the nature contemplated by the invention;

Figs. 6 and 7 illustrate schematically a transmission system of the general type illustrated in Figs. 4 and 5 which includes means for applying 20-cycle signaling currents to the speech transmission lines;

Fig. 8 illustrates schematically the intermediate repeater section of a transmission system of the general type illustrated in Figs. 6 and 7 and shows an alternative method of deriving the phantom circuit;

Fig. 9 illustrates schematically a portion of a transmission system which is similar in general to that of Figs. 6 and 7, the 20-cycle signaling currents being applied at the drop side of the terminal;

Fig. 10 illustrates schematically a portion of a transmission system which is similar in general to that of Fig. 9 but in which separate derivations are provided for the phantom voice frequency circuit and the phantom low frequency circuit; and, Fig. 11 illustrates schematically a portion of a transmission system of the general nature illustrated in Fig. 1 and shows particularly a modification of the direct current by-pass path.

Referring now to the drawings, there is shown schematically in Fig. 1 a portion of a speech transmission system comprising a west terminal, an east terminal and one intermediate repeater section. It will be understood, of course, that the system may, and in many cases will, include more than one repeater between the terminals. The voice frequency equipment at the terminals is not shown in detail but it will be understood that the speech currents of side circuit No. 1 are applied to the primary side of line repeating coil 21, appear through inductive action in the secondary winding of the repeating coil and pass out over lines 22 and 23 and that, similarly, the speech currents of side circuit No. 2 traverse line repeating coil 24 and pass out over lines 25 and 26. Lines 22 and 23 are balanced to ground as are lines 25 and 26 and the other similarly arranged lines of the system.

The speech currents of side circuit No. 1 arriving at the intermediate repeater section pass through repeating coil 27 into line section 28 after which they divide equally, one-half passing by induction into the output circuit of east-west amplifier 31 and being lost and the useful half passing into the input circuit of west-east amplifier 32. This useful portion of the speech currents, after amplification by west-east amplifier 32, passes by induction to line section 33 when the currents again divide equally, one-half being absorbed by balancing network 34 and the useful half being applied through repeating coil 35 to lines 36 and 37. The input circuit of east-west amplifier 31 is so bridged across line section 33 that its terminals are at equal potential with respect to output energy from west-east amplifier 32 so that none of this energy works back through the input circuit to east-west amplifier 31.

The speech currents now pass along lines 36 and 37 and through repeating coil 51 to the voice frequency receiving equipment associated with the east terminal of side circuit No. 1.

It will be understood that the transmission of speech currents from the east terminal to the west terminal over side circuit No. 1 is accomplished in a manner similar to that described above as is transmission of speech currents over side circuit No. 2 from west to east and from east to west.

Capacitances 52 and 53 are connected between line windings 54 and 55 of repeating coil 21; similarly capacitances 56 and 57 are connected between line windings 61 and 62 of repeating coil 24. A phantom circuit is derived over conductors 63 and 64 which are connected respectively to side circuit No. 1 between capacitances 52 and 53 and to side circuit No. 2 between capacitances 56 and 57. The speech currents originating in the phantom circuit voice frequency equipment of the west terminal are applied to conductors 63 and 64 through repeating coil 65.

At the east terminal the phantom circuit derivation is through conductor 66 which is connected to side circuit No. 1 between capacitances 67 and 81 which, in turn, are connected between line windings 82 and 83 of repeating coil 51 and through conductor 84 which is connected to side circuit No. 2 between capacitances 85 and 86, which, in turn, are connected between line windings 87 and 91 of repeating coil 92. The phantom circuit equipment of the east terminal is connected to conductors 66 and 84 through repeating coil 93.

Transmission of speech currents over the phantom circuit is accomplished in a manner generally similar to that described above in connection with side circuit transmission. As shown, a separate intermediate repeater section is provided for the phantom circuit, this repeater section being connected to side circuit No. 1 over conductors 94 and 95 and being connected to side circuit No. 2 over conductors 96 and 97.

Conductor 94 is connected to side circuit No. 1 between capacitances 111 and 112 which, in turn, are connected between line windings 113 and 114 of repeating coil 27 and conductor 95 is connected to side circuit No. 1 between capacitances 115 and 116 which, in turn, are connected between line windings 117 and 121 of repeating coil 35. Conductor 96 is connected to side circuit No. 2 between capacitances 122 and 123 which, in turn, are connected between line windings 124 and 125 of repeating coil 126 and conductor 97 is connected to side circuit No. 2 between capacitances 127 and 141 which, in turn, are connected between line windings 142 and 143 of repeating coil 144.

An inductance 145 and capacitance 146, connected in series, are shown associated with phantom balancing network 147 to provide additional balancing and an inductance 151 and capacitance 152 similarly connected are shown associated with phantom balancing network 153; these elements may or may not be required depending upon the characteristics of a particular system.

Direct current signals, which may be, for example, telegraph signals, are applied to line 22 through composite set inductance 154 and line winding 54 of repeating coil 21 which are connected in series; similarly, direct current signals are applied to line 23 through composite set inductance 155 and line winding 55 of repeating coil 21. Capacitances 52 and 53 maintain proper separation of the direct current signals applied respectively to lines 22 and 23 and prevent passage of these currents into phantom conductor 63.

It will be observed that the composite set inductances 154 and 155 are shunted by a path comprising capacitances 52 and 53 connected in series; a path which, while affording the required high impedance to direct currents, presents a relatively low impedance to the voice frequency speech currents. It follows that the novel connection of the composite signaling sets contemplated by the present invention has very little effect on the voice frequency transmission characteristics and eliminates entirely the vexing problems encountered in the arrangements of the prior art in accordance with which arrangements it was imperative that the composite set inductances be exactly balanced in view of the fact that these inductances were shunted by a high inductance at voice frequencies.

The telegraph (direct current) signals applied to line 22 pass over the line to the intermediate repeater station where they pass through line winding 113 of repeating coil 27 and through by-pass inductance 156 into conductor 157 of the by-pass circuit. (The direct current signals are prevented from passing into line winding 114 or phantom repeater conductor 94 by capacitances 111 and 112.) The direct current signals, after by-passing the intermediate repeater over conductor 157, pass through by-pass inductance 171 and line winding 117 of repeating coil 35 to line 36. In a similar manner the direct current signals applied to line 23 pass over the line to the intermediate repeater point where they pass through line winding 114 of repeating coil 27 and by-pass inductance 172 to by-pass conductor 173. The direct current signals after by-passing the repeater pass through by-pass inductance 174 and line winding 121 of repeating coil 35 to line 37.

It will be observed that, both at the point where the direct current signals are picked off speech transmission lines 22 and 23 at the line side of repeating coil 27 and at the point where they are reapplied to speech transmission lines 36 and 37 at the line side of repeating coil 35, the by-pass inductances are shunted by a capacitance path which, while affording the high impedance to direct currents necessary for proper separation, offers only a low impedance to the voice frequency currents. This means, of course, that connection of the by-pass circuit has practically no effect on the voice frequency transmission characteristics. As a result it is not necessary to include in balancing networks 34 and 175 any elements for balancing the direct current portions of the system. Design and construction of the balancing networks are thereby simplified and made more economical.

In addition to simplification of the balancing requirements, the novel by-pass arrangement illustrated offers substantial savings from elimination of circuit elements of the by-pass circuit itself as compared to arrangements of the prior art and, further, results in improved transmission efficiency in view of the relatively small series resistance included in the entire by-pass circuit.

The direct current signals applied to line 36, as mentioned above, pass over the line to the east terminal where they pass through line winding 82 of repeating coil 51 and composite set inductance 176 to a receiver of the east terminal composite set equipment. Similarly, the direct current signals applied to line 37 pass over the line to the east terminal where they pass through line winding 83 of repeating coil 51 and composite set inductance 177 to another receiver of the east terminal composite set equipment.

Any small portion of the voice frequency currents which may appear in the composite legs of the west terminal equipment will be drained off through capacitances 181 and 182 to ground 183; similar drainage paths are provided, as shown, for the other composite sets.

It will be understood that transmission of direct current signals over side circuit No. 1 from east to west is accomplished in a manner similar to that above as is transmission of direct current signals over side circuit No. 2 from west to east and from east to west. In the arrangement illustrated provisions are not included for transmission of direct current signals over the phantom circuit.

Referring now to Fig. 2, there is illustrated a portion of a speech transmission system of the type illustrated in Fig. 1, the west terminal, line and one repeating coil of the intermediate repeater section being shown. In accordance with this embodiment of the invention both direct current telegraph currents and low frequency (20 cycle) signaling currents are superimposed on the speech lines and only enough of the complete system, as illustrated in Fig. 1, has been included in Fig. 2 to illustrate the modified method of applying these auxiliary signaling currents. It will be understood that the system is otherwise as illustrated in Fig. 1.

As in the instance of the system of Fig. 1 described above, speech currents originating in the voice frequency equipment of side circuit No. 1 are applied through repeating coil 201 to lines 202 and 203 and speech currents originating in the voice frequency equipment of side circuit No. 2 are applied through repeating coil 204 to lines 205 and 206. A phantom circuit for speech currents originated by the voice frequency equipment associated with the phantom terminal is derived over conductor 207 which is connected to side circuit No. 1 between capacitances 211 and 212 and conductor 213 which is connected to side circuit No. 2 between capacitances 214 and 215. Capacitances 211 and 212, in turn, are connected between the line windings of repeating coil 201 and capacitances 214 and 215 are connected between the line windings of repeating coil 204.

Transmission of speech currents over the two side circuits and the voice frequency phantom circuit is accomplished in a manner similar to that described above in connection with Fig. 1.

Low frequency signaling current (20 cycles) which may be used by way of example for ringing purposes is applied to lines 202 and 203 through repeating coil 216 and inductances 217 and 231, capacitances 211 and 212 being effective to provide proper separation and to prevent this low frequency current from flowing into conductor 207. It will be observed that the method of applying the 20-cycle current to the speech transmission lines is similar to that by which the direct currents are applied in accordance with the arrangement of Fig. 1. Here again inductances 217 and 231 are shunted by a capacitance path which, while offering the high impedance to the low frequency current necessary for proper separation, offers only a low impedance to the voice frequency currents. The resultant advantages are the same as those described above in connection with Fig. 1.

A separate derivation for phantom 20-cycle signaling is obtained over conductors 232 and 233 which are connected respectively to the midpoints of the secondary windings of repeating coils 216 and 234. The 20-cycle signaling current for the phantom circuit is applied through repeating coil 235.

Separate derivation of the voice phantom and low frequency phantom circuits is particularly advantageous as series capacitances are eliminated from the low frequency phantom circuit thereby avoiding the loss that would result from such series capacity and increasing the phantom signaling range. The arrangement also provides a telegraph simplex path, the direct current composite set being connected as indicated to the mid-point of the secondary winding of repeating coil 235.

Repeating coils 216 and 234 not only afford derivation of the phantom signaling circuit, but also serve to isolate the ground on the 20-cycle source from the line conductors in order to prevent noise and cross-talk; repeating coil 235 serves a similar purpose. The inductances 236 and 237 included respectively in conductors 232 and 233 are provided to assure that the impedance of the low frequency path between the two side circuits be sufficiently high that it need not be balanced in the phantom repeater balancing network. These inductances also afford 20-cycle transmission gain.

The low frequency signaling currents transmitted over lines 202 and 203 to the intermediate repeater section traverse the respective line windings of repeating coil 241, inductances 242 and 243 and respective conductors 244 and 245 of the by-pass circuit. It will be observed that, as in the instance of the arrangement of Fig. 1, the signaling currents to be by-passed are picked off the voice transmission lines by connections which are similar, generally, to those by which the signaling currents are applied to the line. It will be understood that the phantom 20-cycle signals are by-passed over the by-pass circuits comprising conductors 244 and 245 of side circuit No. 1 and conductors 246 and 247 of side circuit No. 2 while the phantom voice frequency signals are diverted through conductors 261 and 262 to the intermediate phantom repeater.

Referring now to Fig. 3, the portion of the system there disclosed is the same as that shown in Fig. 2 except for the fact that the phantom 20-cycle signaling current is applied in a different manner. In accordance with the arrangement of Fig. 3, the phantom 20-cycle signals are applied through repeating coil 263 and inductances 264 and 265 to conductors 266 and 267 over which the phantom voice frequency circuit is derived, the phantom 20-cycle signals passing through the respective line windings of the phantom repeating coil 271. Direct current telegraph signals are applied as in the arrangement of Fig. 2, that is over conductor 272 which is connected between the mid-point of the secondary winding of repeating coil 273 and the mid-point of the secondary winding of repeating coil 274.

It is not considered necessary to describe the arrangement of Fig. 3 in further detail as its operation will be clear from previous detailed descriptions of Figs. 1 and 2.

Referring now to Figs. 4 and 5, which should be joined left to right, respectively, there is illustrated schematically a portion of a speech transmission system comprising a west terminal repeater section, an intermediate repeater section and an east terminal repeater section. The system of Figs. 4 and 5 differs from that of Fig. 1 principally in the fact that combined line and hybrid type coils are utilized.

At the west terminal repeater section the input path 291 of west-east amplifier 292 and the output path 293 of east-west amplifier 294 are connected in conjugate relationship with each other and in energy transmitting relationship with line section 295 of side circuit No. 1 by the hybrid coils 296 and associated balancing network 297. Similarly, output path 301 of amplifier 292 and input path 302 of amplifier 294 are connected in conjugate relationship with each other and in energy transmitting relationship with lines 303 and 304 by the hybrid coils 305 and associated balancing network 306.

Voice frequency currents impressed on line section 295 by the voice frequency equipment of the west terminal of side circuit No. 1 divide, one half passing into output path 293 of east-west amplifier 294 and being lost and the useful half passing into input path 291 of west-east amplifier 292. These currents, after amplification by west-east amplifier 292, are impressed, through coils of hybrid coils 305, on speech transmission lines 303 and 304. As output path 301 and input path 302 are coupled in conjugate relationship, no part of these amplified currents enters the input path of east-west amplifier 294.

The voice frequency currents pass over lines 303 and 304 to the intermediate repeater section where they again divide among the coils of hybrid coils 321, one half passing into output path 322 of east-west amplifier 323 and being lost and the useful half passing into path 324 of west-east amplifier 325. These currents, after amplification by west-east amplifier 325, are impressed on speech transmission lines 326 and 327 for transmission to the east terminal. As the output path of amplifier 325 and the input path of amplifier 323 are coupled in conjugate relationship through the hybrid coils 331, no part of the amplified currents enters the input path of east-west amplifier 323.

The amplified voice frequency currents pass over lines 326 and 327 to the east terminal where they divide in hybrid coils 332, one-half of the currents passing into output path 333 of east-west amplifier 334 and being lost and the useful half of the currents passing into input path 335 of west-east amplifier 336. These amplified currents are impressed on lines 351 and 352 through hybrid coils 353 and pass over these lines to the voice frequency receiving apparatus of the east terminal. As the output path of amplifier 336 and the input path of amplifier 334 are coupled in conjugate relationship through the hybrid coils 353, no part of the amplified currents enters the input path of amplifier 334.

It will be understood that transmission of voice frequency currents over side circuit No. 1 from east to west is accomplished in a manner similar to that described above as is transmission of voice frequency currents over side circuit No. 2 from west to east and from east to west.

A phantom circuit for transmission of voice frequency currents produced by the transmitting equipment associated with phantom line section 356 of the west terminal is derived over lines 357 and 361. Line 357 is connected to lines 303 and 304 of side circuit No. 1 between capacitances 362 and 363 while line 361 is connected to lines 366 and 367 of side circuit No. 2 between capacitances 364 and 365.

The voice frequency currents originating in line section 356 are amplified by west-east amplifier 381 before they are impressed on the phantom circuit referred to above. Amplifier 381 as well as east-west amplifier 382 and hybrid coils 383 and 384 are similar to the corresponding units of side circuit No. 1 referred to above and operate in a similar manner.

The phantom voice frequency currents are picked off at the intermediate repeater point by lines 385 and 386, line 385 being connected to lines 303 and 304 of side circuit No. 1 between capacitances 387 and 391 and line 386 being connected to lines 366 and 367 of side circuit No. 2 between capacitances 392 and 393. The phantom currents are now amplified by west-east amplifier 394 of the phantom circuit intermediate repeater section after which they are again impressed on the phantom circuit by lines 395 and 396. Upon reaching the east terminal the phantom circuit voice frequency currents are picked off by lines 397 and 411 and, after amplification by west-east amplifier 412, are applied to the phantom voice frequency receiving equipment associated with line section 413.

It will be understood that transmission of voice frequency currents over the phantom circuit from east to west is accomplished in a manner similar to that described above.

Direct current signals, which may, for example, be telegraph signals, are applied to line 303 through composite set retardation coil 421 which is connected in series with line windings 422 and 423 of hybrid coils 305 and are applied to line 304 through composite set retardation coil 424 which is conected in series with line windings 425 and 426 of the hybrid coil network.

It will be noted that a direct, continuous path is provided for the direct current signals at the intermediate repeater section so that these signals continue on without interruption and with no substantial attenuation to the east terminal. Reardation coils 441, 442, 443 and 444 serve to exclude the voice frequency currents from this continuous direct current path.

At the east terminal, the direct current signals, after passing through line windings 445 and 446 of hybrid coil 332 and composite set retardation coil 447 all of which are connected in series with line 326 and through line windings 451 and 452 of the hybrid coils and composite set retardation coil 453 all of which are connected in series with line 327, are impressed on the receivers of the east terminal composite set. Any voice frequency currents which may find their way into the direct current circuit will be drained off through capacitances 454 and 455 to ground 456. (Capacitances 457 and 471 and ground 472 fulfill a similar function at the west terminal.)

It will be understood that transmission of direct current signals over side circuit No. 1 from east to west is accomplished in a manner similar to that described above as is transmission of direct current signals over side circuit No. 2 from west to east and from east to west. In the arrangement of Figs. 4 and 5 no provision is made for transmission of direct current signals over the phantom circuit.

The advantages resulting from the novel arrangements illustrated in Figs. 4 and 5 are similar to those outlined above in reference to Fig. 1. It will be apparent that connection of the composite sets in the manner illustrated has very little effect on the voice frequency transmission characteristics and eliminates balancing problems. The novel way in which the direct current signals are passed directly through the intermediate repeater section is particularly advantageous as it eliminates balancing problems and provides an economical and simple by-passing means.

Referring now to Figs. 6 and 7, which should be joined left to right respectively, there is illustrated schematically a portion of a speech transmission system of the general type illustrated in Figs. 4 and 5 and described in detail above. The system of Figs. 6 and 7 differs from that of Figs. 4 and 5, however, in that means are provided for transmitting 20-cycle signaling current over the two side circuits and the phantom circuit and for transmitting direct current signals over the phantom circuit. Transmission of the voice frequency speech currents over the system is accomplished in a manner similar to that described above in connection with Figs. 4 and 5 and will not be described here except in so far as such transmission may be involved in transmission of the auxiliary signaling currents.

Low frequency signaling currents (20 cycles) which may be used for ringing purposes, for example, are applied to lines 481 and 482 of side circuit No. 1 through repeating coil 483 and composite set retardation coils 484 and 485, retardation coil 484 being connected in series with line windings 486 and 487 of hybrid coils 501 and with line 481 and retardation coil 485 being connected in series with line windings 502 and 503 of the hybrid coils and with line 482. Capacitances 504 and 505 prevent the low frequency current from entering line 506 which is used in deriving the voice frequency phantom circuit and provide at the same time a low impedance path for voice frequency currents.

The 20-cycle signaling currents pass along lines 481 and 482 to the intermediate repeater point. Here the currents, after passing through the respective line windings of hybrid coils 511 and inductances 512 and 513, are impressed on lines 514 and 515 by repeating coil 516. Capacitances 531 and 532 serve to prevent the low frequency currents from entering line 533; capacitances 534 and 535 serve to prevent the currents from entering line 536. Inductances 512 and 513 prevent the voice frequency speech currents from reaching repeating coil 516 over the path provided for the low frequency currents.

The capacitances provide a low impedance path for voice frequency currents while the shunt-capacitance-series-inductance arrangements add voice frequency loss.

The 20-cycle signaling currents pass along lines 514 and 515 to the east terminal where, after traversing the line windings of hybrid coils 541 and inductances 542 and 543, they are impressed on repeating coil 544 by which they are passed to the 20-cycle receiving equipment of the east terminal. Capacitances 545 and 546 prevent the low frequency signaling currents from entering lead 547 of the voice frequency phantom circuit while inductances 542 and 543 prevent the voice frequency speech currents from reaching repeating coil 544.

These capacitances and inductances function in the same manner as the corresponding elements at the intermediate repeater.

It will be understood that transmission of 20-cycle signaling current over side circuit No. 1 from east to west is accomplished in a manner similar to that described above as is transmission of 20-cycle signaling current over side circuit No. 2 from west to east and from east to west.

A low frequency phantom circuit for transmission of 20-cycle signaling currents impressed on the primary winding of repeating coil 561 by low frequency apparatus associated with the east phantom terminal is derived over lines 562 and 563 which are connected respectively to the mid-point of the secondary winding of repeating coil 483 and the mid-point of the secondary winding of repeating coil 564.

Inductances 565 and 566 included respectively in lines 562 and 563 are provided in order to assure that the impedance of the low frequency path between the two side circuits be sufficiently high that it need not be balanced in the phantom repeater balancing network. These inductances, further, afford 20-cycle transmission gain.

The 20-cycle signaling currents applied to the low frequency phantom circuit upon reaching the intermediate repeater section are picked off by lines 571 and 572 which are connected respectively to the mid-point of the primary winding of repeating coil 516 and the mid-point of the primary winding of repeating coil 573. These signaling currents are impressed on repeating coil 574 from which they pass into leads 575 and 576 over which they are returned to the phantom circuit. Inductances 577, 591, 592 and 593 serve a similar function to that of inductances 565 and 566. It has been found that the particular arrangement illustrated whereby the phantom circuit 20-cycle currents are by-passed at the intermediate repeater section by means of a separate repeating coil is a particularly desirable arrangement being effective in preventing telegraph cross-fire between the two side circuits.

The phantom circuit 20-cycle signaling currents upon reaching the east terminal are picked off by leads 594 and 595 and applied through repeating coil 596 to the receiving set of the 20-cycle signaling equipment of the east phantom terminal.

It will be understood that transmission of 20-cycle signaling current over the phantom circuit from east to west is accomplished in a manner similar to that described above.

The circuit elements of the phantom 20-cycle signaling arrangement just described combine to provide also facilities whereby direct current signals (for example, telegraph signals) applied to the mid-point of the secondary winding of repeating coil 561 by direct current transmitting apparatus may be transmitted over the phantom circuit to direct current receiving apparatus connected to the mid-point of the primary winding of repeating coil 574 and whereby direct current signals applied to the mid-point of the secondary winding of repeating coil 574 by direct current transmitting apparatus may be transmitted over the phantom circuit to direct current receiving apparatus connected to the mid-point of the primary winding of repeating coil 596. Direct current signals may also be transmitted over each of the paths from the east terminal to the intermediate repeater section and from the intermediate repeater section to the west terminal in the manner just described. If desired the direct current circuits derived from the phantom can be connected straight through the intermediate repeater section.

Referring now to Fig. 8 there is illustrated the intermediate repeater section of a transmission system of the same general type illustrated in Figs. 6 and 7 but differing therefrom in that the phantom circuit for transmission of both the phantom voice frequency currents and the phantom 20-cycle signaling currents is derived over lines terminating at mid-points of the repeating coil windings. It will be understood that the arrangement of the west and east terminals corresponds to that of the intermediate repeater section which is illustrated.

As shown the phantom voice frequency and 20-cycle signaling currents are picked off at the intermediate section over lines 601 and 602 which are connected respectively to the mid-point of the primary winding of repeating coil 603 and the mid-point of the primary winding of repeating coil 604.

It will be understood that retardation coils 597 and 598 and capacitance 599 combine to provide a filtering action effective to exclude the side circuit voice frequency currents from repeating coil 603, these currents, of course, being diverted through side circuit west-east amplifier 600. The phantom voice frequency currents pass through retardation coils 597 and 598 in parallel, however, and are not appreciably affected thereby. The 20-cycle signaling currents likewise are not affected appreciably by the retardation coils in view of their low frequency.

The phantom voice frequency currents pass through phantom west-east amplifier 605 and, after amplification, are reapplied to the phantom circuit over lines 606 and 607 which are connected respectively to the mid-point of the secondary winding of repeating coil 603 and the mid-point of the secondary winding of repeating coil 604.

Capacitance 621 and inductances 622 and 623 act to block the voice frequency phantom currents from repeating coil 624. The low frequency (20 cycles) phantom signaling currents, however, pass directly to repeating coil 624 by which they are impressed on lines 606 and 607 and returned thereover to the phantom circuit.

It will be understood that the phantom circuit currents pass through the intermediate section from east to west in a manner similar to that described above and it is believed that the operation of the entire system will be clear from the above description of the intermediate repeater section inasmuch as the arrangement of the terminal sections corresponds to that of the intermediate section illustrated and as the general method of operation is similar to that of the systems that have been described above in complete detail. In the arrangement illustrated no means are provided for the transmission of direct current (telegraph) signals over the phantom circuit.

In certain instances it may be desirable to omit the ground shown connected to the mid-point of the repeating coil 624 and in other cases the arrangement of the repeating coil may follow in general that disclosed in Figs. 6 and 7.

Referring now to Fig. 9 there is illustrated the west terminal and one half of the intermediate repeater section of a system of the same general type illustrated in Figs. 6 and 7 but differing therefrom in that the 20-cycle signaling current is applied on the drop side of the terminals and that alternative phantom derivations are provided. It will be understood that the other half of the system is a duplicate of the half illustrated.

Application of the 20-cycle signaling current on the drop side of the terminal permits connection of the 20-cycle ringer directly in the switchboard circuit and eliminates certain direct current control leads between the switchboard and repeater section which it has been necessary to provide heretofore.

Transmission of the voice frequency speech currents is accomplished in a manner similar to that described in detail above and will not be again described at this point. As will be brought out subsequently, alternative derivations are provided for the phantom circuit.

20-cycle signaling current is applied across lines 631 and 632 of side circuit No. 1 on the drop side of the west terminal as indicated. This low frequency current passes directly through the line windings of hybrid coils 633 to repeating coil 634. The 20-cycle currents are impressed on lines 635 and 636 by repeating coil 634; it will be noticed that the arrangement whereby the low frequency signaling currents are impressed on line 635 in series with retardation coil 651 and line windings 652 and 653 of hybrid coils 654 and on line 636 in series with retardation coil 655 and line windings 666 and 667 of the hybrid coils is similar to that by which the low frequency signals are impressed on the lines of the side circuits of the systems previously described.

The low frequency signaling currents pass over lines 635 and 636 to the intermediate repeater section where, after passing through the respective line windings of hybrid coils 661 and retardation coils 662 and 663, they are impressed on repeating coil 664, one half of which is illustrated.

It will be understood that the 20-cycle currents of side circuit No. 1 are transmitted from the intermediate repeater section to the east terminal in a manner similar to that described above and that transmission of 20-cycle signaling currents over side circuit No. 1 from east to west and over side circuit No. 2 in both directions are also accomplished in a similar manner.

Coming now to consideration of the phantom circuits, it will be noticed that 20-cycle signaling current is also applied across the drop side of the phantom terminal. These signaling currents are impressed by repeating coil 665 on lines 668 and 669 over which the phantom circuit for transmission of the phantom speech currents and the phantom 20-cycle signaling currents is derived.

As shown, alternative connections for derivation of the phantom circuit are provided. Assuming, first, that it is not desired to transmit direct current signals over the phantom circuit, the phantom circuit may be derived across capacitances and in such event switch 681 will be placed on contact 682, switch 683 on contact 684, switch 685 on contact 686 and switch 687 on contact 691. The phantom circuit is thereby derived by a connection to the lines of side circuit No. 1 between capacitances 692 and 693 and a connection to the lines of side circuit No. 2 between capacitances 694 and 695.

Assuming, on the other hand, that it be desired to transmit direct current (telegraph) signals over the phantom circuit also (in which instance the direct current connection would be to the mid-point of the secondary winding of repeating coil 665 and to the mid-point of the primary winding of repeating coil 696 as indicated by the dotted lines) switch 681 should then be moved to contact 697, switch 683 to contact 711, switch 685 to contact 712 and switch 687 to contact 713. Through these switch positions the phantom circuit is derived over inductive connections thereby permitting transmission of the direct current signals.

It is believed that it will be clear from previous detailed description of other figures that the phantom voice frequency currents and the phantom auxiliary signaling currents are picked off the side circuits over lines 714 and 715. The phantom voice frequency currents are then amplified by phantom west-east amplifier (not shown) and reapplied to the other half of the phantom circuit leading to the east terminal, the phantom 20-cycle signaling currents are passed directly through repeating coil 696 and reapplied to the other half of the phantom circuit while the direct current signals (if being transmitted) are received by the direct current equipment connected to the mid-point of the primary winding of repeating coil 696. It will be understood, further, that transmission over the phantom circuit from east to west is accomplished in a similar manner.

Referring now to Fig. 10 there is illustrated the west terminal and one half of the intermediate repeater section of a speech transmission system which is of the same general type illustrated in Fig. 9 but which differs therefrom in the fact that separate derivations are provided for the phantom voice frequency circuit and the phantom low frequency signaling circuit. It will be understood that the other half of the system including the east terminal is similar to that illustrated.

Transmission of the voice frequency currents over side circuit No. 1 and side circuit No. 2 is accomplished in a manner similar to that previously described and will not be described again at this point. Transmission of the 20-cycle signaling currents applied to the side circuit terminals is accomplished in a manner similar to that of Fig. 9 except for the fact that, instead of being by-passed at the intermediate repeater section by an inductive coupling provided by repeating coils, these currents are passed by means of a continuous path, retardation coils 721, 722, 723 and 724 being included in the by-pass of side circuit No. 1 and retardation coils 725, 726, 727 and 741 being included in the by-pass of side circuit No. 2.

The voice frequency currents originating at the west phantom circuit after amplification by phantom west-east amplifier 742 are impressed on the voice frequency phantom circuit which is derived over lines 743 and 744. Line 743 is connected between capacitances 745 and 746 which are connected, in turn, across lines 747 and 751 of side circuit No. 1 while line 744 is connected between capacitances 752 and 753 which are connected, in turn, across lines 754 and 755 of side circuit No. 2.

The phantom voice frequency currents upon reaching the intermediate repeater section are picked off over lines 756 and 757 and, after amplification by the intermediate phantom west-east amplifier (not shown), are reapplied to the phantom circuit for transmission to the east terminal. It will be understood that transmission of voice frequency currents over the phantom circuit from east to west is accomplished in a similar manner.

The 20-cycle signaling currents originating at the west phantom terminal are applied to the phantom low frequency signaling circuit derived over lines 771 and 772 which terminate respectively at the mid-point of the secondary winding of side circuit No. 1 repeating coil 773 and the mid-point of the secondary winding of side circuit No. 2 repeating coil 774.

The phantom low frequency signaling currents upon reaching the intermediate repeater section are passed directly to the line leading to the east terminal through side circuit No. 1 retardation coils 721, 722, 723 and 724 and side circuit No. 2 retardation coils 725, 726, 727 and 741. It will be understood that transmission of the phantom low frequency signaling currents from east to west is accomplished in a similar manner.

Referring now to Fig. 11, there is illustrated schematically the intermediate repeater section of one side circuit of a speech transmission system of the general nature illustrated in Fig. 1. The arrangement illustrated differs from that of Fig. 1 in that a modified form of by-pass circuit is utilized.

Inasmuch as the circuit arrangement and operation is the same as that of the circuit of Fig. 1, features of arrangement and operation which are common to both circuits will not be described here. The present description will be confined to the modification of the by-pass path.

As in the arrangements described above, the by-pass path provided for passing direct currents around the voice frequency repeaters comprises two lines 781 and 782, these lines being connected to the two sections of the voice frequency lines in a manner similar to that described above. In accordance with the modification of Fig. 11, however, means have been provided for draining off to ground any small portions of voice frequency currents that may chance to enter the by-pass circuit, thereby preventing the passage of such currents from one line section to another. As illustrated, two such drainage paths are connected across by-pass lines 781 and 782, one path leading to ground 783 through capacitances 784 and 785 and the other path leading to ground 786 through capacitances 787 and 801. Retard coils 802 and 803 connected in series, respectively, with by-pass lines 781 and 782 act to prevent passage of voice frequency currents in these lines while offering substantially no impedance to the passage of the direct current signals.

While certain specific embodiments of the invention have been selected for illustration and detailed description, the invention is not, of course, limited in its application to the embodiments so disclosed. In particular, it should be kept in mind that actual systems will, as a rule, include more than the single intermediate repeater section that has been disclosed. In short, the embodiments of the invention which have been disclosed above should be looked upon as illustrative of the invention and not as restrictive thereof.

What is claimed is:

1. In a speech transmission system, a terminal section, a repeater section, a two-wire line connecting said terminal section and said repeater section, the two wires of said line being balanced to ground, a transmission element of relatively low impedance with respect to voice frequencies connected across the two wires of said line at the terminal side, phantom derivation means connected to said transmission element, and means for connecting a direct current source or a source of alternating current of a frequency substantially less than voice frequency across said transmission element of relatively low impedance with respect to voice frequencies.

2. In a speech transmission system, a terminal section, a repeater section, a two-wire line connecting said terminal section and said repeater section, the two wires of said line being balanced to ground, a composite set for transmission of direct current or alternating current of a frequency substantially below voice frequency, conductive means connected across said two-wire line at said terminal section, said conductive means comprising two portions of high impedance to voice frequencies connected by a portion of low impedance to voice frequencies but of high impedance to currents transmitted by said composite set, phantom derivation means connected to said low impedance portion, and means for connecting said composite set across said portion of low impedance to voice frequencies.

3. In a speech transmission system, a terminal section, a repeater section, a two-wire line connecting said terminal section and said repeater section, the two wires of said line being balanced to ground, a composite set for transmission of direct current or alternating current of a frequency substantially below voice frequency, conductive means connected across said two-wire line at said terminal section, said conductive means comprising a first inductance, two capacitances and a second inductance connected in series in the order named, phantom derivation means connected to said conductive means at a point between said two capacitances, and means for connecting said composite set across said two capacitances.

4. In a speech transmission system, a line for voice frequency transmission, a composite circuit for transmission of direct current or alternating current of a frequency substantially below voice frequency, a two-way repeater, a hybrid coil and balancing network for connecting said line to two sides of said repeater in mutually conjugate relationship, impedance means connected across said line on the line side of said hybrid coil, said means comprising two portions of high impedance to voice frequencies connected by a portion of low impedance to voice frequencies but of high impedance to currents transmitted by said composite set, and means for connecting said composite circuit across said latter portion whereby the balance of said hybrid coil is not upset by connection of said composite circuit to said line.

5. In a speech transmission system, a line for voice frequency transmission, a composite circuit for transmission of direct current or alternating current of a frequency substantially below voice frequency, a two-way repeater, a hybrid coil and balancing network for connecting said line to two sides of said repeater in mutually conjugate relationship, impedance means connected across said line on the line side of said hybrid coil, said impedance means comprising a first inductance, a capacitance and a second inductance connected in series in the order named, and means for connecting said composite circuit across said capacitance whereby the balance of said hybrid coil is not upset by connection of said composite circuit to said line.

6. In a speech transmission system, a first side circuit and a second side circuit, said first side circuit including a terminal section, a repeater section and a two-wire line connecting said terminal section and said repeater section, said second side circuit including a terminal section, a repeater section and a two-wire line connecting said terminal section and said repeater section, the respective two wires of each of said lines being balanced to ground, a composite set associated with each of said terminals for transmission of direct current or alternating current of a frequency substantially below voice frequency, a first conductive means connected across said two-wire line of said first side circuit at said terminal, said first conductive means comprising a first inductance, two capacitances and a second inductance connected in series in the order named, means for connecting the composite set of the first side circuit across said two capacitances, a second conductive means connected across said two-wire line of said second side circuit at said terminal, said second conductive means comprising a first inductance, two capacitances and a second inductance connected in series in the order named, means for connecting the composite set of said second side circuit across said two capacitances of said second conductive means, and means for deriving a phantom circuit from said two side circuits, said last-mentioned means including a conductor connected between said two capacitances of said first conductive means and a conductor connected between said two capacitances of said second conductive means.

7. In a speech transmission system, a west terminal, an intermediate repeater section and an east terminal, a first two-wire line for connecting said west terminal and said intermediate repeater section, a second two-wire line for connecting said east terminal and said intermediate repeater section, the respective wires of each of said lines being balanced to ground, a direct current source at said west terminal, means for connecting said direct current source to the two wires of said first line at the terminal side, said source being connected across a relatively low impedance with respect to voice frequencies, a two-way repeater for voice frequencies at said intermediate repeater section, a first hybrid coil and balancing network for connecting said first two-wire line to two sides of said two-way repeater in mutually conjugate relationship, a second hybrid coil and balancing network for connecting said second two-wire line to two sides of said two-way repeater in mutually conjugate relationship, a first impedance means connected across said first two-wire line on the line side of said first hybrid coil, said first impedance means comprising two portions of high impedance to voice frequencies connected by a portion of low impedance to voice frequencies but of high impedance to direct current, a second impedance means connected across said second two-wire line on the line side of said second hybrid coil, said second impedance means comprising two portions of high impedance to voice frequencies connected by a portion of low impedance to voice frequencies but of high impedance to direct current, and a by-path line for by-passing direct current from said first two-wire line around said two-way repeater to said second two-wire line, said by-path line being connected to said first impedance means and said second impedance means across the respective portions of low impedance to voice frequencies whereby the balance of said hybrid coils is not upset by connection of said by-path line.

8. In a speech transmission system, a west terminal, an intermediate repeater section and an east terminal, a first two-wire line for connecting said west terminal and said intermediate repeater section, a second two-wire line for connecting said east terminal and said intermediate repeater section, the respective wires of each of said lines being balanced to ground, a direct current source at said west terminal, conductive means connected across said first two-wire line at the terminal side, said conductive means comprising a first inductance, a capacitance and a second inductance connected in series in the order named, means for connecting said direct current source across said capacitance, a two-way repeater for voice frequencies at said intermediate repeater section, a first hybrid coil and balancing network for connecting said first two-wire line to two sides of said two-way repeater in mutually conjugate relationship, a second hybrid coil and balancing network for connecting said second two-wire line to two sides of said two-way repeater in mutually conjugate relationship, a first impedance means connected across said first two-wire line on the line side of said first hybrid coil, said first impedance means comprising a first inductance, a capacitance and a second inductance connected in series in the order named, a second impedance means connected across said second two-wire line on the line side of said second hybrid coil, said second impedance means comprising a first inductance, a capacitance and a second inductance connected in series in the order named and a by-path line for by-passing direct current from said first two-wire line around said two-wire repeater to said second two-wire line, said by-path line being connected to said first impedance means and said second impedance means across said respective capacitances whereby the balance of said hybrid coils is not upset by connection of said by-path line.

9. In a speech transmission system, a west terminal section, an intermediate repeater section, an east terminal section, a first two-wire line for connecting said west terminal section and said intermediate repeater section, a second two-wire line for connecting said intermediate repeater section and said east terminal, the respective two wires of each of said lines being balanced to ground, means at said west terminal for applying voice frequency currents to the terminal end of said first two-wire line, a source of alternating current signals of a frequency substantially below voice frequency at said west terminal, means for applying signals from said source to the terminal end of said first two-wire line, a two-way repeater for currents of voice frequency at said intermediate repeater section, a path for voice frequency currents from the repeater section end of said first two-wire line through a portion of said two-way repeater to the repeater section end of said second two-wire line, and a path including a repeating coil for repeating signals produced by said source from the repeater section end of said first two-wire line to the repeater section end of said second two-wire line, said last-mentioned path including means for preventing the passage of voice frequency currents therethrough.

10. In a speech transmission system, a first side circuit and a second side circuit, said first side circuit including a terminal, a repeater section and a first two-wire line connecting said terminal and said repeater section, said second side circuit including a terminal, a repeater section and a second two-wire line connecting said last-mentioned terminal and said last-mentioned repeater, the respective two wires of each of said lines being balanced to ground, a first conductive means connected across the terminal side of said first two-wire line, said first conductive means comprising a first inductance, two capacitances and a second inductance connected in series in the order named, a first source of low frequency signaling currents associated with said first side circuit, means for applying currents from said first source across said capacitances, said last-mentioned means including a first repeating coil, a second conductive means connected across the terminal side of said second two-wire line, said second conductive means comprising a first inductance, two capacitances and a second inductance connected in series in the order named, a second source of low frequency signaling currents associated with said second side circuit, means for applying currents from said second source across said two capacitances of said second conductive means, said last-mentioned means including a second repeating coil, a phantom terminal, means for deriving from said two side circuits a voice frequency phantom circuit for transmission of voice frequency currents produced at said phantom terminal, said last-mentioned means including a conductor connected to said first side circuit between said two capacitances of said first conductive means and a conductor connected to said second side circuit between said two capacitances of said second conductive means, a third source of low frequency signaling current associated with said phantom terminal, means for deriving a low frequency phantom circuit from said two side circuits, said last-mentioned means including a conductor connected to the mid-point of the secondary winding of said first repeating coil and a conductor connected to the mid-point of the secondary winding of said second repeating coil, means for applying currents from said third source to said last-mentioned two conductors, said last-mentioned means including a third repeating coil, a source of direct current signals associated with said phantom terminal, and means for applying signals from said direct current source to said low frequency phantom circuit, said last-mentioned means including a connection to the mid-point of the secondary winding of said third repeating coil.

11. In a speech transmission system, a first side circuit and a second side circuit, said first side circuit including a terminal, a repeater section and a first two-wire line connecting said terminal and said repeater section, said second side circuit including a terminal, a repeater section and a second two-wire line connecting said last-mentioned terminal and said last-mentioned repeater, the respective two wires of each of said lines being balanced to ground, a first conductive means connected across the terminal side of said first two-wire line, said first conductive means comprising a first inductance, two capacitances and a second inductance connected in series in the order named, a first source of low frequency signaling currents associated with said first side circuit, means for applying currents from said first source across said capacitances, said last-mentioned means including a first repeating coil, a second conductive means connected across the terminal side of said second two-wire line, said second conductive means comprising a first inductance, two capacitances and a second inductance connected in series in the order named, a second source of low frequency signaling currents associated with said second side circuit, means for applying currents from said second source across said two capacitances of said second conductive means, said last-mentioned means including a second repeating coil, a phantom terminal, means for deriving from said two side circuits a phantom circuit for transmission of alternating currents produced at said phantom terminal, said last-mentioned means including a conductor connected to said first side circuit between said two capacitances of said first conductive means and a conductor connected to said second side circuit between said two capacitances of said second conductive means, means for applying voice frequency currents produced at said phantom terminal to said two conductors, a third source of low frequency signaling current associated with said phantom terminal, means for applying currents produced by said third source to said conductors, a source of direct current signals associated with said phantom circuit, and means for deriving from said two side circuits a phantom circuit for transmission of signals produced by said direct current source, said last-mentioned means including a conductor connected to the mid-point of the secondary winding of said first repeating coil and a conductor connected to the mid-point of the secondary winding of said second repeating coil.

12. In a speech transmission system, a west terminal section, an intermediate repeater section, an east terminal section, a first two-wire line for connecting said west terminal and said intermediate repeater section and a second two-wire line for connecting said intermediate repeater section and said east terminal section, a two-way repeater for voice requency currents at said west terminal section, a hybrid coil network at said west terminal section for connecting said first line to two sides of said repeater in mutually conjugate relationship, said network including a line winding in series with each side of said first two-wire line, a source of direct current signals at said west terminal section, means for applying signals from said source to each side of said first two-wire line in series with a respective one of said line windings, conductive means connected across said first two-wire line between the point at which said direct current signals are applied and the respective one of said line windings, a two-way repeater for voice frequencies at said intermediate repeater section, a path for voice frequency currents from said first two-wire line through a portion of said last-mentioned two-way repeater to said second two-wire line, and a direct path excluding said last-mentioned repeater for direct currents from said first two-wire line to said second two-wire line, said direct path including means for preventing the passage of voice frequency currents therethrough.

13. In a speech transmission system, a west terminal, an intermediate repeater section and an east terminal, a first two-wire line for connecting said west terminal and said intermediate repeater section, a second two-wire line for connecting said east terminal and said intermediate repeater section, the respective wires of each of said lines being balanced to ground, a direct current source at said west terminal, conductive means connected across said first two-wire line at the terminal side, said conductive means comprising a first inductance, a capacitance and a second inductance connected in series in the order named, means for connecting said direct current source across said capacitance, a two-way repeater for voice frequencies at said intermediate repeater section, a first hybrid coil and balancing network for connecting said first two-wire line to two sides of said two-way repeater in mutually conjugate relationship, a second hybrid coil and balancing network for connecting said second two-wire line to two sides of said two-way repeater in mutually conjugate relationship, a first impedance means connected across said first two-wire line on the line side of said first hybrid coil, said first impedance means comprising a first inductance, a capacitance and a second inductance connected in series in the order named, a second impedance means connected across said second two-wire line on the line side of said second hybrid coil, said second impedance means comprising a first inductance, a capacitance and a second inductance connected in series in the order named and a by-path line for by-passing direct current from said first two-wire line around said two-way repeater to said second two-wire line, said by-path line being connected to said first impedance means and said second impedance means across said respective capacitances whereby the balance of said hybrid coils is not upset by connection of said by-path line, said by-path line including a first conductor and a second conductor, a first capacitance connected across said first and said second conductors, a second capacitance connected across said first and said second conductors, an inductance connected in series with said first conductor and an inductance connected in series with said second conductor, said inductances being connected in said conductors between the respective points of connection of said capacitances.

14. In a speech transmission system, a first side circuit, said first side circuit including a west terminal, an intermediate repeater section, an east terminal, a first two-wire line for connecting said west terminal and said intermediate repeater section, a second two-wire line for connecting said intermediate repeater section and said east terminal, the respective two wires of each of said lines being balanced to ground, a second side circuit, said second side circuit including elements corresponding to those of said first side circuit and being symmetrically arranged with respect to said first side circuit, a first two-way repeater for voice frequency currents at the west terminal of said first side circuit, a hybrid coil network for connecting said first two-wire line to two sides of said repeater in mutually conjugate relationship, a line winding of said hybrid coil network being connected in series with each wire of said first two-wire line, means for applying voice frequency currents to said first line, a first source of alternating current signals of a frequency substantially below voice frequencies associated with said first side circuit, means for applying currents produced by said first source to said first two-wire line, said means including a first repeating coil the secondary winding of which is connected across the terminal end of said first line, two capacitances connected in series across said first line between said line windings of said hybrid coil network and said secondary winding, a second two-way repeater for voice frequency currents at the intermediate repeater section of said first side circuit, means for passing voice frequency currents from the repeater section end of said first two-wire line through a portion of said second repeater to the repeater end of said second two-wire line, a path for passing currents produced by said first source from the repeater end of said first line to the repeater end of said second line, said path including a second repeating coil the primary winding of which is connected across the repeater end of said first line and the secondary winding of which is connected across the repeater end of said second line, a first pair of capacitances connected in series, a second pair of capacitances connected in series, said first pair of capacitances being connected across the primary winding of said second repeating coil, said second pair of capacitances being connected across the secondary winding of said second repeating coil, a west phantom terminal, means at said phantom terminal for producing voice frequency currents, means at said phantom terminal for producing alternating current signals of a frequency substantially below voice frequency, means for deriving a phantom circuit from said first and second side circuits for transmitting voice frequency current produced by said phantom terminal, said last-mentioned means including a conductor connected between said first two capacitances, means for deriving a phantom circuit from said two side circuits for transmission of low frequency alternating currents produced at said phantom terminal, said last-mentioned means including a conductor connected to the mid-point of the secondary winding of said first repeating coil, an intermediate phantom repeater section, means at said intermediate repeater section of said first side circuit for picking off phantom voice frequency currents for application to said intermediate phantom repeater section, said last-mentioned means including a conductor connected between said first pair of capacitances, means for reapplying phantom voice frequency currents to the phantom circuit, said last-mentioned means including a conductor connected between said second pair of capacitances, means at said intermediate repeater section of said first side circuit for picking off low frequency phantom currents for application to said intermediate phantom repeater section, said last-mentioned means including a conductor connected to the mid-point of the primary winding of said second repeating coil, and means for reapplying low frequency phantom currents to the phantom circuit, said last-mentioned means including a conductor connected to the mid-point of the secondary winding of said second repeating coil.

15. In a speech transmission system, a first side circuit, said first side circuit including a west terminal, an intermediate repeater section, an east terminal, a first two-wire line for connecting said west terminal and said intermediate repeater section, a second two-wire line for connecting said intermediate repeater section and said east terminal, the respective two wires of each of said lines being balanced to ground, a second side circuit, said second side circuit including elements corresponding to those of said first side circuit and being symmetrically arranged with respect to said first side circuit, a first two-way repeater for voice frequency currents at the west terminal of said first side circuit, a hybrid coil network for connecting said first two-wire line to two sides of said repeater in mutually conjugate relationship, a line winding of said hybrid coil network being connected in series with each wire of said first two-wire line, means for applying voice frequency currents to said first line, a first source of alternating current signals of a frequency substantially below voice frequencies associated with said first side circuit, means for applying currents produced by said first source to said first two-wire line, said means including a first repeating coil, the secondary winding of which is connected across the terminal end of said first line, two capacitances connected in series across said first line between said line windings of said hybrid coil network and said secondary winding, a west phantom terminal, means at said west phantom terminal for producing voice frequency currents, and means for deriving from said first and second side circuits a phantom circuit for transmission of voice frequency currents produced at said phantom terminal, said last-mentioned means including a conductor and a switch for alternately connecting said conductor either to the mid-point of the secondary winding of said first repeating coil or between said two capacitances.

16. In a speech transmission system, a first side circuit and a second side circuit, said first side circuit including a terminal section, a repeater section and a two-wire line connecting said terminal section and said repeater section, the two wires of said line being balanced to ground, a composite set for transmission of direct current or alternating current of a frequency substantially below voice frequency, conductive means connected across said two-wire line at said terminal section, said conductive means comprising a first inductance, two capacitances and a second inductance connected in series in the order named, means for connecting said composite set across said capacitances, said second side circuit including elements corresponding to those of said first side circuit and being symmetrically arranged with respect to said first side circuit, a phantom terminal and means for producing at a point between the respective two capacitances of the two side circuits differences in potential corresponding to varying speech currents produced at said phantom terminal.

PAUL G. EDWARDS.
EDMUND R. TAYLOR.